United States Patent [19]

Faulkner

[11] Patent Number: 5,065,860

[45] Date of Patent: Nov. 19, 1991

[54] CONNECTORS FOR WOVEN CONVEYOR BELTS

[76] Inventor: William G. Faulkner, 6701 Newman Dr., Oklahoma City, Okla. 73162

[21] Appl. No.: 508,870

[22] Filed: Apr. 12, 1990

[51] Int. Cl.⁵ .............................................. B65G 15/54
[52] U.S. Cl. ..................................... 198/848; 198/853
[58] Field of Search ........................ 198/848, 851, 853; 24/39, 370

[56] References Cited

U.S. PATENT DOCUMENTS

| | | | |
|---|---|---|---|
| 2,826,383 | 3/1958 | Spencer, Jr. | 198/848 X |
| 2,862,602 | 12/1958 | Greer et al. | 198/848 |
| 3,425,536 | 2/1969 | Shader | 198/853 |
| 3,620,356 | 11/1971 | Poerink | 198/848 |
| 3,794,155 | 2/1974 | Bechtel, Jr. | 198/848 |
| 4,262,392 | 4/1981 | White | 24/39 X |
| 4,754,871 | 7/1988 | Gustafson | 198/848 |
| 4,957,597 | 9/1990 | Irwiin | 198/848 X |

OTHER PUBLICATIONS

Photograph showing one metal woven conveyor belt.

Primary Examiner—Joseph E. Valenza
Assistant Examiner—Tuan N. Nguyen
Attorney, Agent, or Firm—Dunlap, Codding, Peterson & Lee

[57] ABSTRACT

An improvement in a woven conveyor belt comprising a plurality of links wherein the improvement comprises a plurality of connectors with each connector having one portion connected to one of the links and another portion connected to another link for cooperating to substantially prevent the woven conveyor belt from becoming unwoven or unconnected.

2 Claims, 4 Drawing Sheets

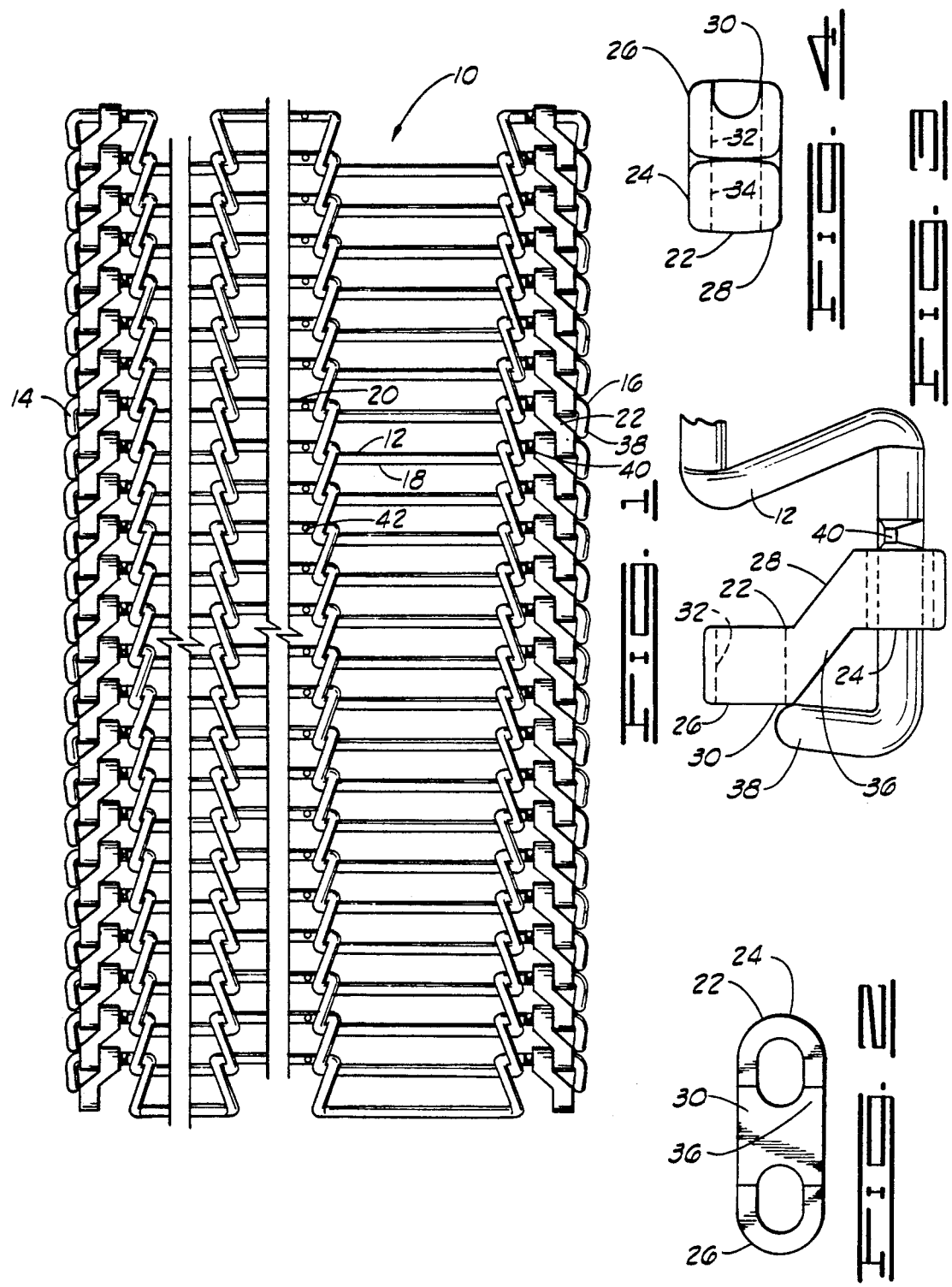

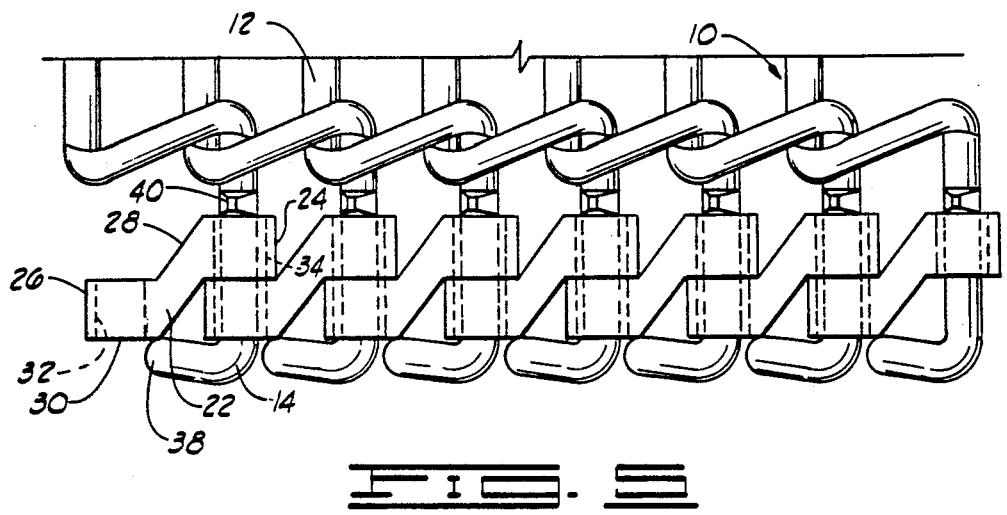
FIG. 3
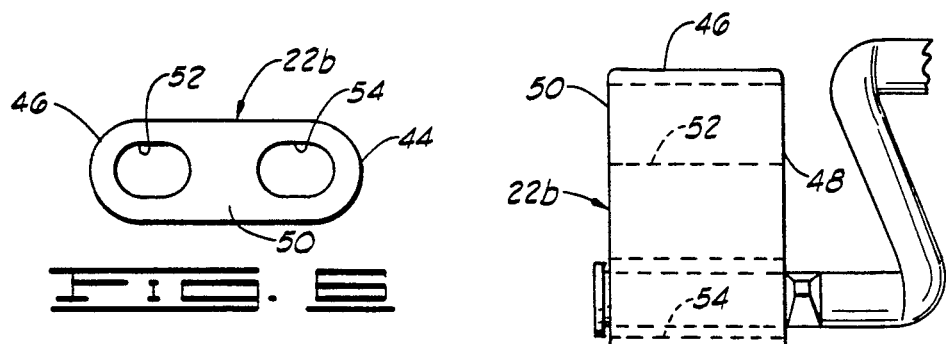
FIG. 6
FIG. 7
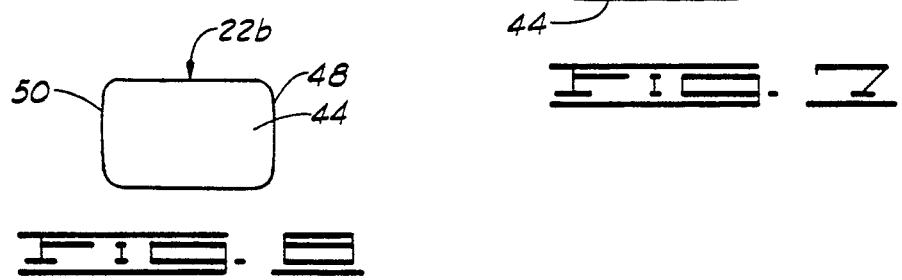
FIG. 8
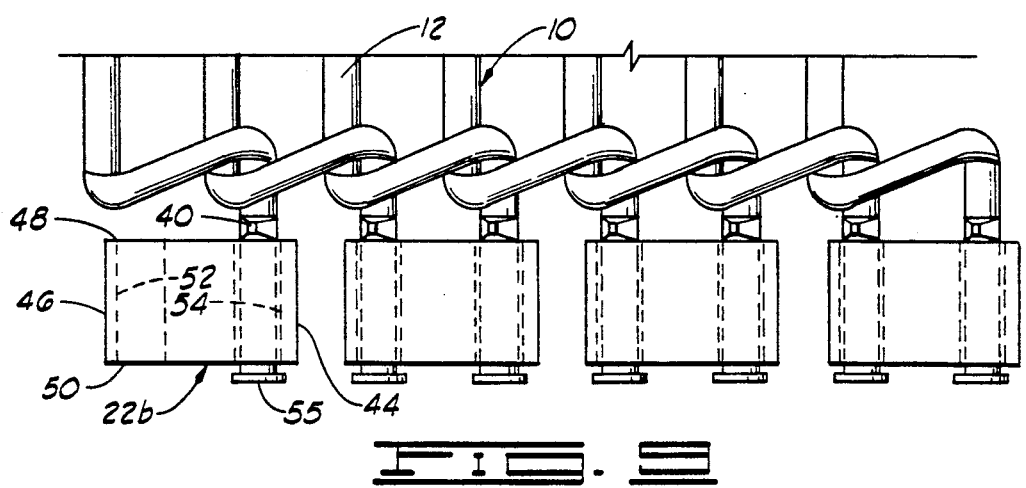
FIG. 9

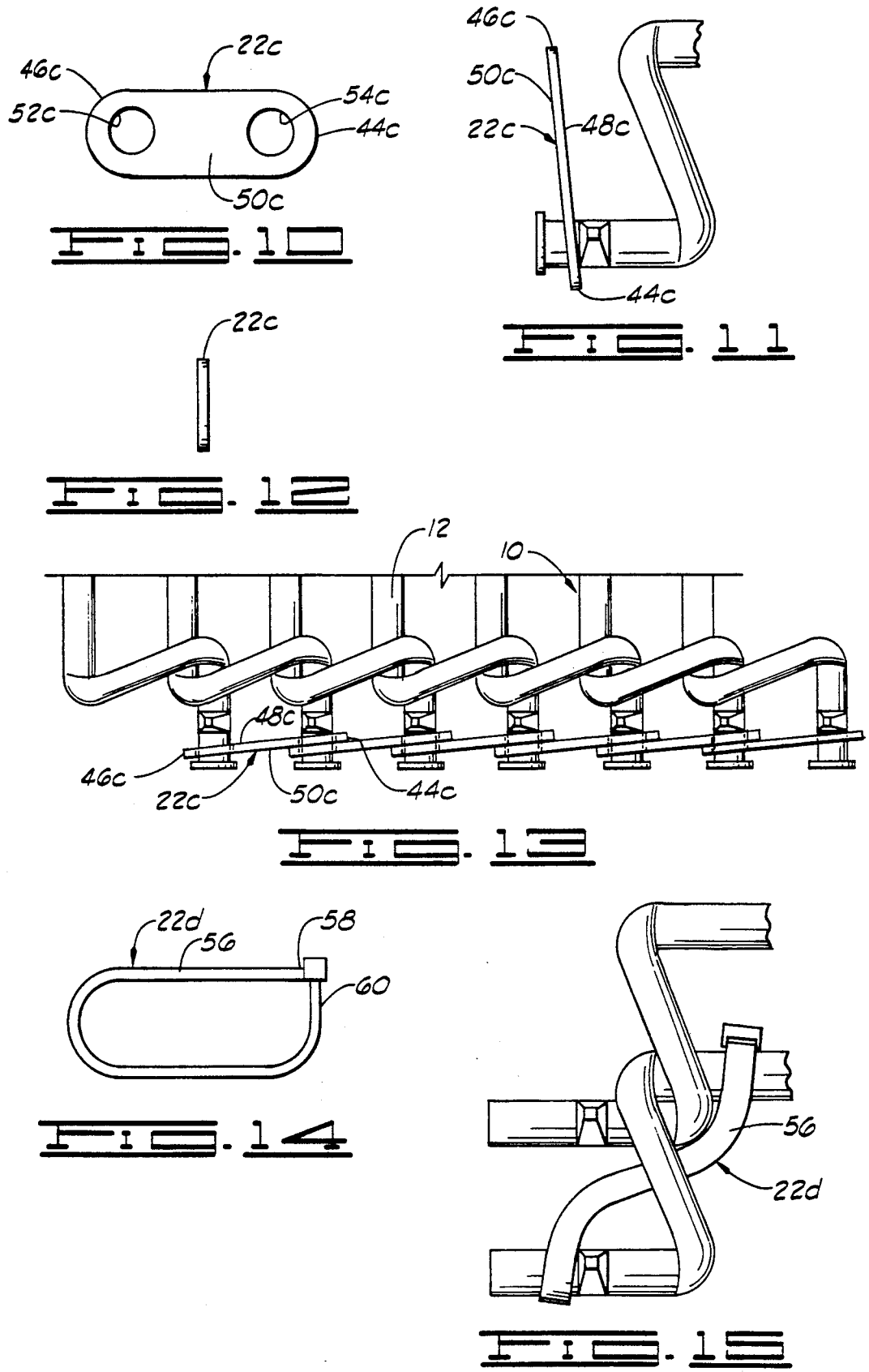

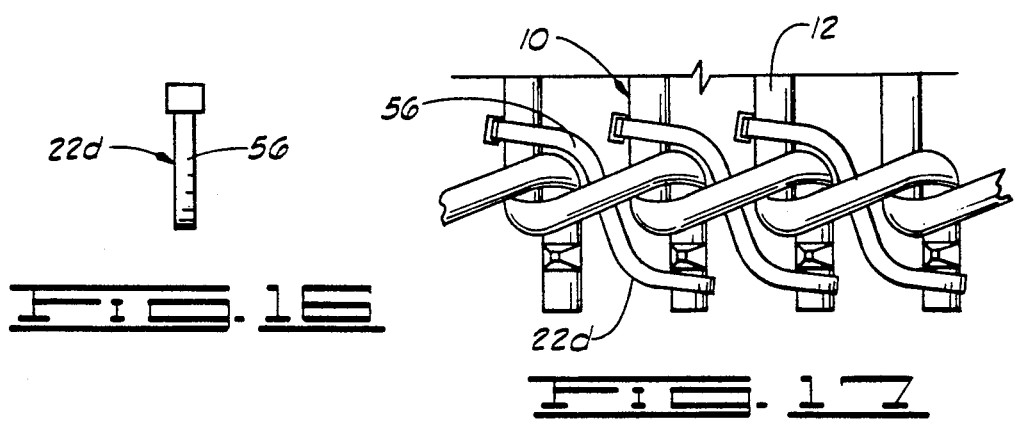
FIG. 16
FIG. 17
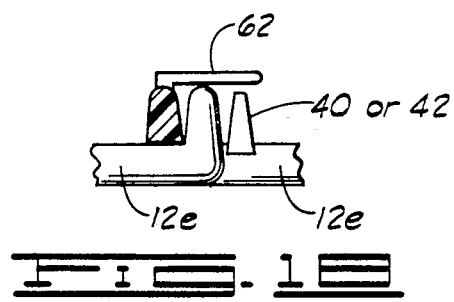
FIG. 18
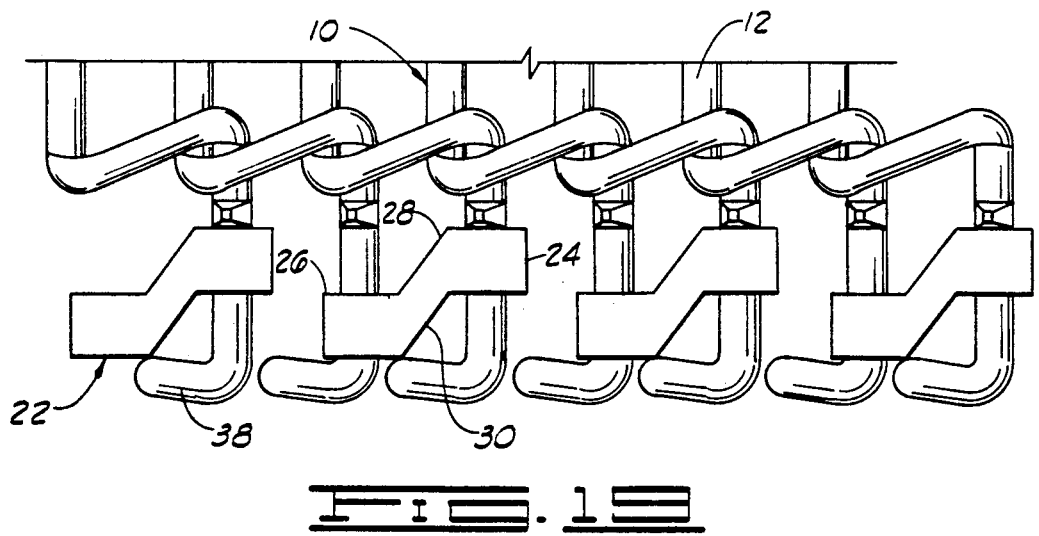
FIG. 19

CONNECTORS FOR WOVEN CONVEYOR BELTS

FIELD OF THE INVENTION

The present invention relates generally to improvements in a woven conveyor belt comprising a plurality of links wherein the improvement comprises a plurality of connectors with one portion of each connector connected to one of the links and another portion of each connector connected to one of the other links for preventing the links from becoming unwoven or unconnected during the operation of the woven conveyor belt.

BRIEF DESCRIPTION OF THE DRAWINGS

FIG. 1 is a top elevational view showing a portion of a woven conveyor belt with connectors constructed in accordance with the present invention.

FIG. 2 is a side elevational view of a typical connector used with the woven conveyor belt of FIG. 1.

FIG. 3 is a top elevational view of the connector of FIG. 2 shown connected to one of the links.

FIG. 4 is an end elevational view of the connector shown in FIGS. 1, 2 and 3.

FIG. 5 is a fragmentary view of a portion of the woven conveyor belt shown in FIG. 1 with the connectors of FIG. 1, 2, 3 and 4 connected thereto.

FIG. 6 is a side elevational view of the modified connector.

FIG. 7 is a top plan view of the modified connector of FIG. 6 shown connected to one link.

FIG. 8 is an end elevational view of the connector of FIGS. 6 and 7.

FIG. 9 is an enlarged view of a portion of the woven conveyor belt constructed similar to the woven conveyor belts of FIGS. 1 and 5, but showing the modified connector of FIG. 6, 7 and 8 connected to the ends of the links.

FIG. 10 is a side elevational view of another modified connector.

FIG. 11 is a top plan view of the modified connector of FIG. 10 shown connected to a link.

FIG. 12 is an enlarged view of a portion of the woven conveyor belt constructed similar to the woven conveyor belts of FIGS. 1, 5 and 9, but showing the modified connector of FIGS. 10, 11 and 12 connected to the ends of the links.

FIG. 13 is an enlarged view of a portion of a woven conveyor belt constructed similar to the woven conveyor belts of FIGS. 1, 5, 9 and 12, but showing another modified connector connected to the ends of the links.

FIG. 14 is a side elevational view another modified connector.

FIG. 15 is a top plan view of the modified connector of FIG. 14.

FIG. 16 is an end elevational view of the modified connector of FIGS. 14 and 15.

FIG. 17 is an enlarged view of a portion of the woven conveyor belt with the connectors of FIGS. 14, 15 and 16 thereon.

FIG. 18 is an enlarged view of a portion of two links showing a modified means for holding the links in the connected position.

FIG. 19 is an enlarged view showing a portion of the woven conveyor belt with the connectors of FIGS. 1-5 connected thereto in a different manner.

DESCRIPTION OF THE PREFERRED EMBODIMENTS

Shown in FIG. 1 and designated therein by the reference numeral 10 is a portion of a woven conveyor belt. In practice, the woven conveyor belt 10 is connected to form an endless conveyor which then is driven via a drive means to convey material or objects in a manner well known in the art.

The woven conveyor belt 10 comprises a plurality of links 12 with one of the links 12 being designated via a specific reference numeral in FIG. 1. Each link has a first end 14 and a second end 16. Each link 12 has a plurality of forward extending clips 18 and a plurality of rearward extending clips 20 with each of the rearward extending clips 20 being disposed generally between two of the forward extending clips 18 so that the forward extending clips 18 and the rearward extending clips 20 combine in each link 12 to provide an overall square wave effect.

Each of the forward extending clips 18 is clippably connectable to one of the forward extending clips 18 on an adjacent link 12 and each of the rearward extending clips 20 on each of the links 12 is clippably connectable to one of the rearward extending clips 20 on an adjacent link 12 for weavably interconnecting each of the links 12 to an adjacent link 12 to form the woven conveyor 10.

Woven conveyor belts having links constructed similar to the links 12 which include forward extending clips and rearward extending clips like the forward extending clips 18 and the rearward extending clips 20 and which are clippably connectable to interconnect the links are old in the art and well known to those skilled in the art and a detailed description of the overall construction of such links and the interconnection of such links to form woven conveyor belts is not deemed necessary.

In accordance with the present invention, each of the links 12 is constructed of a plastic material such as Acetal. It has been found in practice that, when the links 12 are constructed of plastic, there is a greater tendency for the links to become unclipped during the operation of the woven conveyor belt 10 in some applications. That is, there is a tendency for some of the forward extending clips 18 to become unclipped from adjacent forward extending clips 18 and for some of the rearward extending clips 20 to become unclipped from the adjacent rearward extending clips 20 during the operation of the woven conveyor belt 10 in some operating conditions and in some applications. The present invention particularly defines an improvement in woven conveyor belts and in particular in the plastic woven conveyor belt 10 for maintaining the forward extending clips 18 clipped to adjacent forward extending clips 18 and for maintaining the rearward extending clips 20 clipped to adjacent rearward extending clips 20 during the operation of the woven conveyor belt 10.

As shown in FIGS. 1-5 a plurality of connectors 22 are connected to the links 12 with only one of the connectors 22 being designated by a specific reference numeral in FIG. 1. Each of the connectors 22, as shown more clearly in FIGS. 2-5, comprises a first connector end 24 and a second connector end 26. Each connector 22 also comprises a first connector side 28 and a second connector side 30.

The first connector end 24 is offset from the second connector end 26. A first opening 34 is formed through the first connector end 24. A second connector opening 32 is formed through the second connector end 26. A base 36 connects the first connector end 24 to the second connector end 26 in the offset position described before.

The first end 14 and/or the second end 16 of each of the links 12 extends through the first opening 34 in one of the connectors 22 in the first connector end 24 of each of the connectors 22, and the first and 14 and/or the second end 16 of each of the links 12 extends through the second opening 32 of one of the other connectors 22. Each connector 22 is thus connected to the first end 14 and/or the second end 16 of one of the links 12 to the first end 14 and/or the second end of an adjacent link 12. Each of the first ends 14 and each of the second ends 16 of each of the links 12 is bent at an angle to form a deformed portion 38 (only one second end 16 being designated with a reference numeral in FIGS. 1, 3 and 5) for preventing the first ends 14 and the second end 16 from becoming disconnected from the connectors 22. The offset first and second connector ends 24 and 26 cooperate so that the first connector ends 24 of one of the connectors 22 is connectable to the first end 14 and/or second end 16 of one of the links 12 and the second connector end 26 of one of the connectors 22 is connected to the first end 14 and/or the second end 16 of the adjacent link 12, whereby the first connector end 24 of each connector 22 is connected to the first end 14 or the second end 16 of each link 12 and the second connector end 26 of each of the connectors 22 is connected to the first end 14 or the second end 16 of each of the links 12. The connectors 22 cooperate to substantially prevent the forward extending clips 18 and the rearward extending clips 20 from becoming unclipped during the operation of the conveyor belt 10.

A post 40 (only one post 40 being designated with a reference numeral in FIGS. 1 and 3) is formed on each of the forward extending clips generally near one edge thereof and a post 42 (only one post 42 being designated with a reference numeral in FIG. 1) is formed on each of the forward extending clips 18 generally near the opposite edge thereof. Each of the posts 40 and 42 extends a distance generally upwardly from the forward extending clips 18. When one of the forward extending clips 18 on one of the links 12 is clipped to a forward extending clip 18 on an adjacent link 12, one edge of the forward extending clip 18 is disposed generally between a portion of the forward extending clip 18 on the adjacent link 12 and the post 40 and a portion of each of the forward extending clips 18 is disposed generally between a portion of the forward extending clip 18 on an adjacent link 12 and the post 42. Each of the posts 40 and 42 is engagable with a portion of one of the forward extending clips 18 during the operation of the woven conveyor belt 10 when the woven conveyor belt 10 is under tension. As the forward extending clip 18 tends to become disengaged or unclipped from the forward extending clip 18 on the adjacent link 12, the portions of the forward extending clips 18 engage either the posts 40 or 42 for preventing the forward extending clips 18 from becoming unclipped.

Shown in FIGS. 6, 7, 8 and 9 is another modified connectors 22b and the woven conveyor belt 10 would include a plurality of the modified connectors 22b. Each clip 22b includes a first connector end 44, a second connector end 46, a first connector side 48 and a second connector 50. A first opening 54 is formed through a portion of the first connector end 44 intersecting the first and the second connector sides 48 and 50. A second opening 52 is formed through a portion of the second connector end 46 intersecting the first and second connector sides 48 and 50.

In operation, the one end of the links 12 extends through the first opening 52 and one end of an adjacent link 12 extends through the second opening 54, as shown in FIG. 9. The ends 14 or 16 of the two links 12 are deformed such as by contacting the ends with a hot iron for example to prevent the first ends 14 or 16 from exiting the first and the second openings 54 and 52 and disconnecting the connectors 22b from the ends 14 or 16. The first connector end 44 of each of the connectors 22b is connected to the ends 14 or 16 of one of the links 12 and the second connector end 46 of that connector 22b is connected to the ends 14 or 16 of an adjacent link 12. The connectors 22b function in a manner like the connectors 22 described before for cooperating to connect the links 12 and prevent the forward extending clips 18 and the rearward extending clips 20 from becoming unclipped or disengaged during the operation of the woven conveyor belt 10.

Shown in FIGS. 10–13 is another modified connector 22c. The connector 22c is constructed exactly like the connector 22b, except the connector 22c is thinner so that the various portions of the connector 22c are designated with reference numerals corresponding to the reference numerals designating such like components of the connector 22b. The thinner construction of the connector 22c is adapted so that the first connector end 44c of each connector 22c is connected the ends 14 or 16 of each link 12 and the second connector end 46 of each connector 22c is connected to the ends 14 or 16 of each adjacent link 12. The thinner construction is adapted so that portions of two connectors 22c are disposable on the ends 14 or 16 of each of the links 12. The ends 14 or 16 are deformed to prevent the first ends from exiting the first and the second openings 52c and 54c in a manner and for reasons like that described before with respect to the connectors 22b.

Shown in FIGS. 14–17 is another modified connector 22d. The connector 22d comprises a strap 56 having opposite ends 58 and 60. Each strap 56 extends about the ends 14 or 16 of one of the links 12 and about the ends 14 or 16 of an adjacent link 12. The opposite ends 58 and 60 of each strap 56 are secured in this position thereby securely connecting the strap 56 about the links 12.

Shown in FIG. 18 is a portion of modified woven conveyor which is constructed exactly like the woven conveyor belt 10 described before, except the woven conveyor belt in FIG. 18 includes a bridge 62 connected to each post 40 or 42 and to another portion of each forward extending clip 18. In this embodiment, a portion of each adjacent forward extending clip 18 extends generally through the opening formed by the post 40 or 42 and the bridge 62. The bridges 62 cooperate with the posts 40 and 42 for securing each forward extending clip 18 clipped or connected to each adjacent forward extending clip 18.

Shown in FIG. 19 is a fragmentary portion of a woven conveyor belt 10 which is constructed exactly like the woven conveyor belt 10 shown in FIG. 1 and described in detail before. The woven conveyor belt 10 shown in FIG. 19 includes a plurality of clips 22. Each of the clips 22 is constructed exactly like the clips 22 shown in FIGS. 1–5 and described in detail before. With respect to FIG. 19, the first connector end 24 more particularly is connected to one of the links 12 and the second connector end 26 is connected to an adjacent link 12. The connectors 22 function in a manner like that described before with respect to the connectors 22 to maintain the links 12 in a clipped or connected condition during the operation of the conveyor belt 10.

Changes may be made in the construction and the operation of the various components, elements and assemblies described herein without departing from the spirit and scope of the invention as defined in the following claims.

What is claimed is:

1. An improvement in a woven conveyor belt comprising a plurality of links with each link having opposite ends and a plurality of forward extending clips and a plurality of rearward extending clips wherein each of the forward extending clips on each of the links is clippably connectable to one of the forward extending clips on an adjacent link and wherein each of the rearward extending clips on each of the links is clippably connectable to one of the rearward extending clips on an adjacent link assembly, for connecting the links to form the woven conveyor belt, the improvement comprising:

each link being constructed of a plastic;

a plurality of connectors, each connector having one portion connected to one of the links and another portion connected to an adjacent link whereby the connectors cooperate to substantially prevent the rearward extending clips and the forward extending clips from becoming unclipped during the operation of the woven conveyor belt; and a pair of posts disposed on each rearward extending clip with each post being disposed near an adjacent rearward clip whereby the posts cooperate with the rearward extending clips for preventing the rearward extending clips from becoming unclipped during the operation of the woven conveyor belt.

2. An improvement in a woven conveyor belt comprising a plurality of links with each link having opposite ends and a plurality of forward extending clips and a plurality of rearward extending clips wherein each of the forward extending clips on each of the links is clippably connectable to one of the forward extending clips on an adjacent link and wherein each of the rearward extending clips on each of the links is clippably connectable to one of the rearward extending clips on an adjacent link assembly, for connecting the links to form the woven conveyor belt, the improvement comprising:

each link being constructed of a plastic;

a plurality of connectors, each connector having one portion connected to one of the links and another portion connected to an adjacent link whereby the connectors cooperate to substantially prevent the rearward extending clips and the forward extending clips from becoming unclipped during the operation of the woven conveyor belt; and a plurality of bridges, each bridge being connected to each rearward extending clip is disposed generally under one of the bridges connected to the rearward extending clips and another portion of each forward extending clip is disposed generally under one of the bridges connected to the rearward extending clip.

* * * * *